US005491519A

United States Patent [19]

Kim

[11] Patent Number: 5,491,519
[45] Date of Patent: Feb. 13, 1996

[54] PRE-PROCESSING FILTER APPARATUS FOR USE IN AN IMAGE ENCODING SYSTEM

[75] Inventor: Jong-Hoon Kim, Seoul, Rep. of Korea

[73] Assignee: Daewoo Electronics Co., Ltd., Seoul, Rep. of Korea

[21] Appl. No.: 357,797

[22] Filed: Dec. 16, 1994

[30] Foreign Application Priority Data

Dec. 16, 1993 [KR] Rep. of Korea ............ 1993-27996

[51] Int. Cl.$^6$ ............................................ H04N 5/21
[52] U.S. Cl. ............................................ 348/620; 348/608
[58] Field of Search ............................ 348/608, 612, 348/618, 619, 620, 621, 607, 409, 415, 416, 417; 358/167, 36; H04N 5/21, 5/213

[56] References Cited

U.S. PATENT DOCUMENTS 4,754,322  6/1988  Okuda ............................ 348/607

Primary Examiner—James J. Groody
Assistant Examiner—Sherrie Hsia
Attorney, Agent, or Firm—Anderson Kill Olick & Oshinsky

[57] ABSTRACT

A novel pre-processing filter apparatus for use in an image encoding system, capable of adaptively filtering an input digital video signal, comprises a circuit for delaying a current frame of the input digital video signal by one frame interval; a circuit for generating a difference signal representing the difference between averaged pixel value for N×N pixels of the delayed previous frame and an averaged pixel value for N×N pixels of the current frame, at an identical area of the previous frame and the current frame; two or more filtering circuits arranged in parallel for filtering the input digital video signal, respectively, each of the filtering circuits having different cutoff frequencies; and a control circuit for generating one of the filtered digital video signals in response to the difference signal.

2 Claims, 1 Drawing Sheet

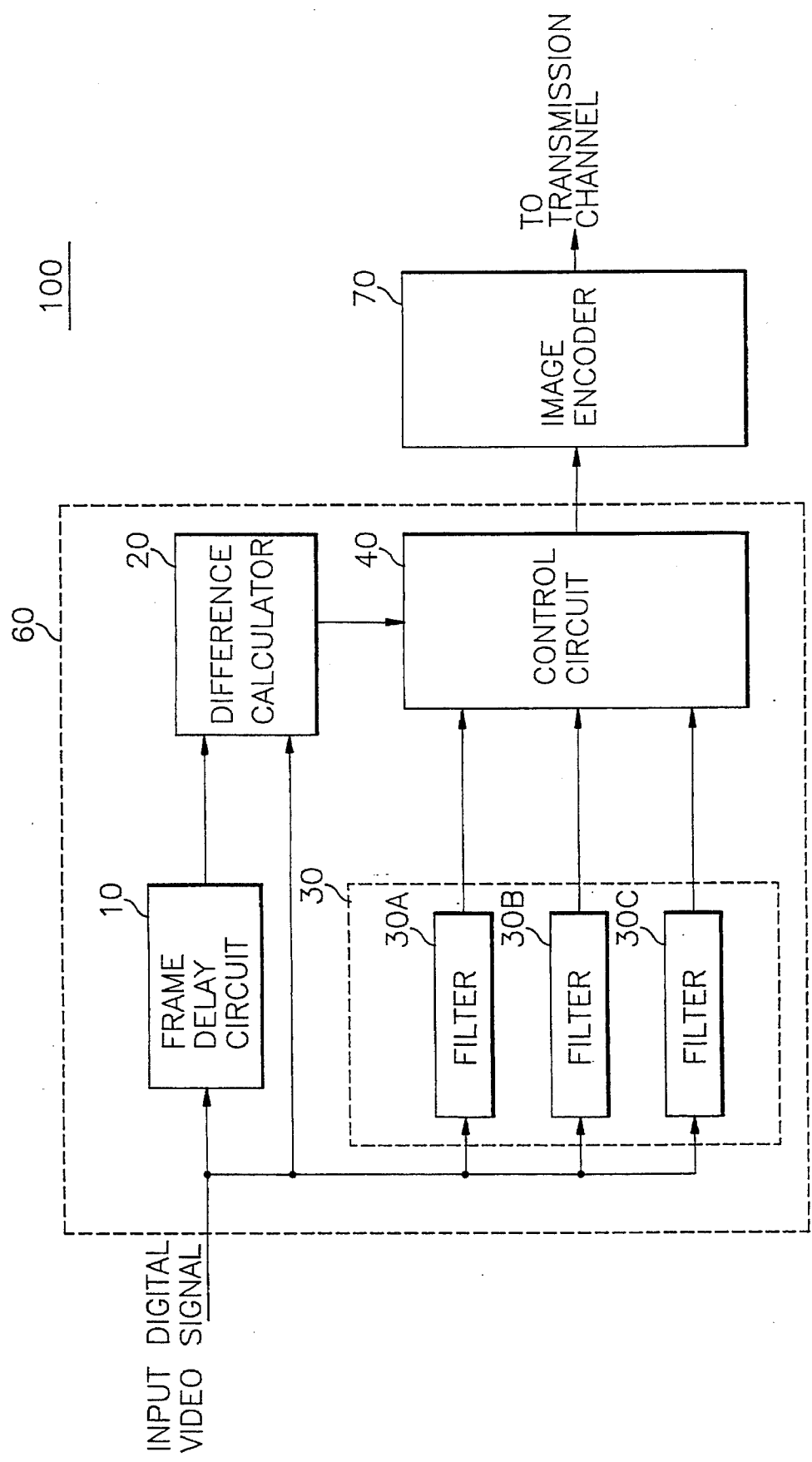

PRE-PROCESSING FILTER APPARATUS FOR USE IN AN IMAGE ENCODING SYSTEM

FIELD OF THE INVENTION

The present invention relates to a filter apparatus; and, more particularly, to an improved pre-processing filter apparatus for use in an image encoding system, for adaptively filtering an input digital video signal based on the difference of pixel values between two successive frames.

Description of the Prior Art

In various electronic applications such as high definition television and video telephone systems, an image encoding system has been used to reduce a large volume of data defining each frame of a digital video signal by way of employing various data compression techniques, for example, transform coding using Discrete Cosine Transform, and motion compensation coding based on temporal relationship between a previous and a current frames.

In order to effectively carry out the data compression process and improve the picture quality, most real-time image encoding systems available in the art employ various preprocessing filter apparatus. These filter apparatus serve to eliminate or alleviate temporal noises and perform band limitation to thereby improve the picture quality and coding efficiency.

One of such prior art apparatus is disclosed in an article by Andria Wong et al., "MCPIC: A Video Coding Algorithm for Transmission and Storage Applications", *IEEE Communications Magazine*, pp.24–32(November,1990), which selectively generates either original data, linearly filtered data, or a weighted sum of the original data and the linearly filtered data based on the absolute value of the difference between the original data and the linearly filtered data. This filter can reduce aliasing effects and noises and improve the image quality significantly. The filtering device, however, may introduce artifacts in those areas where motions occur in relatively high speeds.

U.S. Pat. No. 5,231,484 issued to Cesar A. Gonzales et al. offers another prior art apparatus which employs a set of median filters for adaptively providing filtered data based on quantization levels of previously coded frames in order to meet a certain target bit rate.

Since, however, this filter performs filtering of a current frame based on the quantization levels of previously coded frames, the filtered data therefrom may not be able to reflect the details of the current frame.

SUMMARY OF THE INVENTION

It is, therefore, a primary object of the invention to provide a pre-processing filter apparatus for use in an image encoding system, capable of adaptively filtering an input digital video signal based on the difference of pixel values between two successive frames, thereby improving the picture quality and the coding efficiency.

In accordance with one aspect of the invention, there is provided a pre-processing filter apparatus for use in an image encoding system for adaptively filtering an input digital video signal wherein the input digital video signal includes a plurality of frames, which comprises: means for delaying a current frame of the input digital video signal by one frame interval; means for generating a difference signal representing the difference between an averaged pixel value for N×N pixels of the delayed previous frame and an averaged pixel value for N×N pixels of the current frame, at an identical area of the previous frame and the current frame; two or more filtering means arranged in parallel for filtering the input digital video signal, respectively, each of said filtering means having different cutoff frequencies; and control means for generating one of the filtered digital video signals in response to the difference signal.

In accordance with another aspect of the invention, there is provided an image encoding system for adaptively encoding an input digital video signal wherein said input digital video signal includes a plurality of frames, which comprises: means for delaying a current frame of the input digital video signal by one frame interval; means for generating a difference signal representing the difference between an averaged pixel value for N×N pixels of the delayed previous frame and an averaged pixel value for N×N pixels of the current frame, at an identical area of the previous frame and the current frame; two or more filtering means arranged in parallel for filtering the input digital video signal, respectively, each of said filtering means having different cutoff frequencies; control means for generating one of the filtered digital video signals in response to the difference signal; and means for eliminating redundancies in the generated digital video signal in order to compress the generated digital video signal to a manageable size for the transmission thereof.

BRIEF DESCRIPTION OF THE DRAWING

The above and other objects and features of the present invention will become apparent from the following description of preferred embodiments taken in conjunction with the accompanying drawing (FIG. 1) which is a block diagram illustrating a pre-processing filter apparatus in accordance with the present invention.

DETAILED DESCRIPTION OF THE PREFERRED EMBODIMENTS

Referring to FIG. 1, there is shown an image encoding system 100 having a pre-processing filter apparatus 60 in accordance with a preferred embodiment of the present invention.

The image encoding system 100 comprises the preprocessing filter apparatus 60 and an image encoder 70 wherein the pre-processing filter apparatus 60 includes a frame delay circuit 10, a difference calculator 20, a filtering device 30 and a control circuit 40.

In the pre-processing filter apparatus 60, an input digital video signal is generated from a video frame source, e.g., video camera(not shown), and applied to the frame delay circuit 10, the difference calculator 20 and the filtering device 30. The input digital video signal comprises a series of video frames, each of the video frames being divided into a plurality of blocks of an identical size. The frame delay circuit 10 has a frame buffer memory wherein the input digital video signal is delayed by one frame interval. The delayed digital video signal is then applied to the difference calculator 20 as previous frame data.

The difference calculator 20 receives current frame data directly fed from the video frame source and the previous frame data from the frame delay circuit 10 and compares each block in the current frame with a corresponding block positioned at the same location of the previous frame to thereby generate a non-motion compensated difference signal representing the differences between pixel values of the two blocks. The difference signal can be obtained by comparing an averaged pixel value for N×N, e.g., 8×8, pixels of the previous frame with an averaged pixel value for 8×8 pixels of the current frame, at an identical area of the previous frame and the current frame. Subsequently, the difference signals obtained at the difference calculator 20 are sequentially applied to the control circuit 40.

In the meanwhile, the filtering device 30 receives the input digital video signal of the current frame directly fed from the video frame source and performs a filtering process on the current frame, e.g., on a 8×8 pixel basis which is identical to the process unit for the difference calculation in the difference calculator 20, by using a plurality of filters having predetermined cutoff frequencies different from each other. That is, the filter device 30 includes M, e.g., 3, conventional low pass filters 30A to 30C, which are coupled in a parallel manner in order to simultaneously perform the filtering process for the current frame with cutoff frequencies CF1, CF2 and CF3, respectively, wherein CF1<CF2<CF3. Each of the low pass filters can be implemented by using such digital filters as a Median filter and Laplacian filter well known in the art.

It should be noted that the number of filters and the cutoff frequencies thereof can be determined based on the required coding efficiency and picture quality of the image encoding system.

The digital video signals for each block of the current frame filtered at the filters 30A to 30C and the corresponding difference signal obtained at the difference calculator 20 are simultaneously applied to the control circuit 40 which serves to generate, as an output signal, one of the filtered digital video signals in response to the corresponding difference signal from the difference calculator 20.

For instance, if the difference signal is smaller than or equal to a first predetermined threshold value TH1, the control circuit 40 outputs a filtered digital video signal from the filter 30C in order to decrease data compression rates, and if the difference signal is greater than or equal to a 2nd predetermined threshold value TH2 from the difference calculator 20, it outputs a filtered digital video signal from the filter 30A in order to increase data compression rates. Also, if the difference signal has a value between the 1st predetermined threshold value TH1 and the 2nd predetermined threshold value TH2, it outputs a filtered digital video signal from the filter 30B, wherein the 1st and 2nd threshold values TH1 and TH2 are positive integers with TH2 being greater than TH1. As a result, the present invention is capable of performing a pre-processing filtering operation that best reflects actual human visual characteristics.

It should be noted that the threshold values in the control circuit can be determined based on the required coding efficiency and picture quality of the image encoding system.

The outputted digital video signal from the control circuit 40 is then applied to the image encoder 70 which serves to compress the outputted digital video signal by using, e.g., a discrete cosine transformer, a quantizer and a variable length coder as well known in the art. That is, the image encoder 70 eliminates redundancies in the outputted digital video signal from the control circuit 40 in order to compress the digital video signal to a more manageable size for the transmission thereof.

While the present invention has been shown and described with reference to the particular embodiments, it will be apparent to those skilled in the art that many changes and modifications may be made without departing from the spirit and scope of the invention as defined in the appended claims.

What is claimed is:

1. A pre-processing filter apparatus for use in an image encoding system for adaptively filtering an input digital video signal wherein the input digital video signal includes a plurality of frames, which comprises:

means for delaying a current frame of the input digital video signal by one frame interval;

means for generating a difference signal representing the difference between an averaged pixel value for N×N pixels (where N is a positive integer) of a previous frame which is the delayed current frame and an averaged pixel value for N×N pixels of the current frame, at an identical area of the previous frame and the current frame;

two or more filtering means arranged in parallel for filtering the input digital video signal, respectively, each of said filtering means having different cutoff frequencies; and control means for generating one of the filtered digital video signals in response to the difference signal.

2. An image encoding system for adaptively encoding an input digital video signal wherein said input digital video signal includes a plurality of frames, which comprises:

means for delaying a current frame of the input digital video signal by one frame interval;

means for generating a difference signal representing the difference between an averaged pixel value for N×N pixels (where N is a positive integer) of a previous frame which is the delayed current frame and an averaged pixel value for N×N pixels of the current frame, at an identical area of the previous frame and the current frame;

two or more filtering means arranged in parallel for filtering the input digital video signal, respectively, each of said filtering means having different cutoff frequencies;

control means for generating one of the filtered digital video signals in response to the difference signal; and means for eliminating redundancies in the generated filtered digital video signal in order to compress the generated filtered digital video signal to a manageable size for transmission thereof.

* * * * *